(12) United States Patent
Saenz Villalobos et al.

(10) Patent No.: US 12,533,141 B2
(45) Date of Patent: *Jan. 27, 2026

(54) REPOSITIONAL OVER THE SCOPE CLIP WITH FRANGIBLE LINK

(71) Applicants: BOSTON SCIENTIFIC MEDICAL DEVICE LIMITED, Galway (IE); BOSTON SCIENTIFIC SCIMED, INC., Maple Grove, MN (US)

(72) Inventors: Gonzalo Jose Saenz Villalobos, Alajuela (CR); Paul Smith, Smithfield, RI (US); Deepak Kumar Sharma, Muzaffarnagar (IN); Sharath Kumar G, Kanakapura (IN)

(73) Assignees: Boston Scientific Medical Device Limited, Galway (IE); Boston Scientific Scimed, Inc., Maple Grove, MN (US)

( * ) Notice: Subject to any disclaimer, the term of this patent is extended or adjusted under 35 U.S.C. 154(b) by 492 days.

This patent is subject to a terminal disclaimer.

(21) Appl. No.: 18/150,521

(22) Filed: Jan. 5, 2023

(65) Prior Publication Data
US 2023/0277194 A1   Sep. 7, 2023

Related U.S. Application Data

(60) Provisional application No. 63/268,948, filed on Mar. 7, 2022.

(51) Int. Cl.
*A61B 17/128* (2006.01)
*A61B 17/00* (2006.01)
*A61B 17/122* (2006.01)

(52) U.S. Cl.
CPC ........ *A61B 17/1285* (2013.01); *A61B 17/122* (2013.01); *A61B 2017/00296* (2013.01); *A61B 2017/00486* (2013.01)

(58) Field of Classification Search
None
See application file for complete search history.

(56) References Cited

U.S. PATENT DOCUMENTS

| | | | |
|---|---|---|---|
| 2002/0032454 A1* | 3/2002 | Durgin | A61B 17/1227 606/151 |
| 2002/0062130 A1* | 5/2002 | Jugenheimer | A61B 17/1285 606/142 |

(Continued)

FOREIGN PATENT DOCUMENTS

| | | |
|---|---|---|
| CN | 111214271 A | 6/2020 |
| JP | 2005503231 A | 2/2005 |

(Continued)

*Primary Examiner* — Shaun L David
(74) *Attorney, Agent, or Firm* — Fay Kaplun & Marcin, LLP (57) ABSTRACT

A clipping system includes an adapter, a clip and a first extending member. The clip includes first and second jaws which are movable between an insertion configuration and an initial deployed configuration. The jaws are biased toward the initial configuration. The first member is releasably coupled to the clip and movably connected to the adapter. The first member includes a distal end releasably coupled to the first jaw such that longitudinal movement of the first member relative to the adapter moves the clip between the insertion configuration, the initial configuration and a review configuration. The first member is operable to retract the clip proximally over the adapter so that the clip is forced open as the clip is retracted over the adapter. A first releasable link connects the first member to the clip and releases when the first member is subject to a force exceeding a predetermined threshold value.

15 Claims, 7 Drawing Sheets

(56) References Cited

U.S. PATENT DOCUMENTS

| | | | |
|---|---|---|---|
| 2005/0070758 A1* | 3/2005 | Wells | A61B 17/1285 600/104 |
| 2005/0080440 A1* | 4/2005 | Durgin | A61B 17/122 606/151 |
| 2005/0192596 A1 | 9/2005 | Jugenheimer et al. | |
| 2007/0282353 A1* | 12/2007 | Surti | A61B 17/1285 606/142 |
| 2007/0293875 A1* | 12/2007 | Soetikno | A61B 17/1227 606/142 |
| 2008/0177135 A1* | 7/2008 | Muyari | A61B 1/00087 600/104 |
| 2009/0149870 A1* | 6/2009 | Jugenheimer | A61B 17/1285 606/139 |
| 2011/0190578 A1* | 8/2011 | Ho | A61B 1/00089 600/104 |
| 2013/0072946 A1* | 3/2013 | Terada | A61B 17/122 606/157 |
| 2013/0123807 A1* | 5/2013 | Wells | A61B 17/083 606/142 |
| 2014/0228864 A1* | 8/2014 | Jugenheimer | A61B 17/122 606/157 |
| 2015/0201946 A1* | 7/2015 | Shepard | A61B 17/1227 606/142 |
| 2015/0305741 A1* | 10/2015 | Satake | A61B 17/1285 606/142 |
| 2018/0085122 A1* | 3/2018 | Ryan | A61B 17/1227 |
| 2019/0231353 A1* | 8/2019 | Saenz Villalobos | A61B 17/1285 |
| 2020/0100791 A1* | 4/2020 | Tsuchiya | A61B 17/122 |
| 2020/0397445 A1* | 12/2020 | Shikhman | A61B 17/10 |

FOREIGN PATENT DOCUMENTS

| | | |
|---|---|---|
| JP | 2011120884 A | 6/2011 |
| JP | 2021522986 A | 9/2021 |
| KR | 20210020089 A | 2/2021 |

* cited by examiner

REPOSITIONAL OVER THE SCOPE CLIP WITH FRANGIBLE LINK

PRIORITY CLAIM

The present disclosure claims priority to U.S. Provisional Patent Application Ser. No. 63/268,948 filed Mar. 7, 2022; the disclosure of which is incorporated herewith by reference.

FIELD

The present disclosure relates to endoscopic devices and, in particular, relates to endoscopic clipping devices for treating tissue along the gastrointestinal tract.

BACKGROUND

Physicians have become more willing to perform aggressive interventional and therapeutic endoscopic gastrointestinal (GI) procedures, which may increase the risk of perforating the wall of the GI tract or may require closure of the GI tract wall as part of the procedure. Such procedures may include, for example, the removal of large lesions, tunneling under the mucosal layer of the GI tract to treat issues below the mucosa, full thickness removal of tissue, treatment of issues on other organs by passing outside of the GI tract, and endoscopic treatment/repair of post-surgical issues (e.g., post-surgical leaks, breakdown of surgical staple lines, and anastomotic leaks). Currently, tissue may be treated via endoscopic closure devices including through-the scope clips or over-the-scope clips. Over-the-scope clips may be particularly useful for achieving closure of larger tissue defects. These endoscopic closure devices can save costs for the hospital and may provide benefits for the patient.

In some cases, however, current endoscopic closure devices may be difficult to use, time consuming to position, or insufficient for certain perforations, conditions and anatomies. For example, current over-the-scope clips generally require launching of the clip from a position in which the clip itself is not visible to the operator. That is, prior to clipping the operator may view the target tissue to be clipped and, based on this visualization of the target tissue may determine that the distal end of the device and the clip are in a desired position relative to the target tissue. Based on the observation of the target tissue, the operator then deploys the clip without being able to see the clip itself until it is deployed. Once deployed, such current over-the scope clips are generally incapable of being repositioned.

SUMMARY

The present disclosure relates to a clipping system for treating tissue which includes an adapter, a clip and a first extending member. The adapter includes a proximal portion configured to be mounted over a distal end of an insertion device and a distal portion extending distally from the proximal portion. The clip is configured to be mounted over the distal portion of the adapter, the clip including first and second jaws connected to one another such that the first and second jaws are movable between an insertion configuration, in which the first and second jaws extend about opposing portions of the distal portion of the adapter and are separated from one another to receive tissue therebetween, and an initial deployed configuration, in which the clip is moved distally off of the adapter so that the first and second jaws are drawn toward one another to grip tissue therebetween, the first and second jaws being biased toward the initial deployed configuration.

The first extending member is releasably coupled to the clip and movably connected to the adapter. The first extending member includes a distal end releasably coupled to the first jaw such that longitudinal movement of the first extending member relative to the adapter moves the clip between the insertion configuration, the initial deployed configuration and to a review configuration in which the adapter is withdrawn proximally away from the clip while the first extending member remains coupled to the clip to enhance visual observation of the clip, the first extending member being operable to retract the clip proximally over the adapter so that the clip is forced open as the clip is retracted over the adapter. A first releasable link connects the first extending member to the clip. The first releasable link is configured to release when the first extending member is subject to a force exceeding a predetermined threshold value.

In an embodiment, the first jaw includes an opening extending therethrough from a first surface of the clip which, in an operative configuration, faces toward the adapter, to a second surface which, in the operative configuration, faces away from the adapter, the opening configured to receive a portion of the first extending member therein.

In an embodiment, the system further includes a capsule received within the opening of the first jaw, the capsule including a socket sized, shaped and configured to pivotally receive an enlarged distal end of the first extending member therein, the first extending member being configured to break when a force exerted on the first extending member exceeds a predetermined threshold level, wherein the capsule is configured so that, when the first extending member breaks, the enlarged distal end remains within the capsule.

In an embodiment, the capsule includes a channel extending therethrough along a central axis, in communication with the socket, a distal opening of the capsule being sized and shaped to permit passage of the enlarged distal end of the first extending member therethrough and a proximal opening of the capsule being sized and shaped to prevent a passage of the enlarged distal end of the first extending member therethrough.

In an embodiment, the capsule includes a slot extending from the socket to an exterior thereof, the slot configured to permit a portion of the remaining length of the first extending member to be moved therealong as the first extending member is pivoted from a first position, in which the remaining length extends along the first surface of the clip, toward a second position in which the remaining length extends transverse to the first jaw.

In an embodiment, the system further includes a cap configured to cover the distal opening of the capsule so that, upon separation of the enlarged distal end of the first extending member from the remaining length thereof during a final deployment, the enlarged distal end of the first extending member remains trapped within the capsule.

In an embodiment, the distal opening of the capsule is keyed to a size and shape of the enlarged distal end of the first extending member.

In an embodiment, the opening includes a countersink therearound along the second surface of the clip, the countersink sized, shaped and configured to pivotally receive the enlarged distal end of the first extending member.

In an embodiment, the system further includes a cap sized and shaped to cover the countersink along the second surface so that, upon separation of the enlarged distal end of the first extending member from the remaining length of the first extending member during final deployment of the clip, the enlarged distal end remains trapped within the opening of the clip.

In an embodiment, the system further includes a second extending member releasably coupled to the clip and movably connected to the adapter, the second extending member including an enlarged distal end pivotally coupled to the second jaw such that longitudinal movement of the second extending member relative to the adapter moves the clip between the insertion configuration, the initial deployed configuration and the review configuration, a second releasable link connecting the enlarged distal end of the second extending member to a remaining length of the second extending member, the second releasable link configured to release when the second extending member is subject to a force exceeding a predetermined threshold value.

In an embodiment, the system further includes a first sheath extending slidably over the first extending member so that a distal end thereof is configured to be positioned proximally of the first surface of the clip, the clip configured to be drawn proximally against the distal end of the first sheath during a final deployment of the clip.

The present disclosure also relates to a clipping system for treating tissue which includes an endoscope extending longitudinally from a proximal end to a distal end; an adapter including a proximal portion configured to be mounted over a distal end of the endoscope and a distal portion extending distally from the proximal portion; a clip configured to be mounted over the distal portion of the adapter, the clip including first and second jaws connected to one another such that the first and second jaws are movable between an insertion configuration, in which the first and second jaws extend about opposing portions of the distal portion of the adapter and are separated from one another to receive tissue therebetween, and an initial deployed configuration, in which the clip is moved distally off of the adapter so that the first and second jaws are drawn toward one another to grip tissue therebetween, the first and second jaws being biased toward the initial deployed configuration; and first and second extending members releasably coupled to first and second jaws of the clip, respectively, each of the first and second extending members including a distal end releasably coupled to a corresponding one of the first and second jaws such that longitudinal movement of the first and second extending members relative to the adapter moves the clip between the insertion configuration, the initial deployed configuration and a review configuration, in which the adapter is permitted to be withdrawn proximally away from the clip while the first and second extending members remain coupled to the clip to enhance visual observation of the clip, the first and second extending members being operable to retract the clip proximally over the adapter so that the clip is forced open as the clip is retracted over the adapter, a releasable link connecting the first and second extending members to the clip, the releasable link configured to release when the first and second extending members are subject to a force exceeding a predetermined threshold value.

In an embodiment, the system further includes first and second sheaths extending slidably over the first and second extending members, respectively, distal ends of the first and second sheaths being configured to be positioned proximally of the first surface of the clip, the clip configured to be drawn proximally against the distal ends of the first and second coils during final deployment of the clip.

In an embodiment, the system further includes a handle configured to remain outside a living body accessible to a user of the system. The handle includes a handle member; a spool mounted slidably over the handle member and connected to proximal ends of the first and second extending members to control movement of the first and second extending members relative to the adapter; and a sheath holder connected to proximal ends of the first and second sheaths and frictionally engaged with a portion of the spool so that, when the coil holder is unlocked relative to the handle member, longitudinal movement of the spool relative to the handle member moves the first and second extending members, and the first and second sheaths together.

In an embodiment, the user interface further includes a rotating knob rotatably mounted over a portion of the handle member to interface with the sheath holder to move the sheath holder between an unlocked configuration, in which the sheath holder is movable together with the spool, and a locked configuration, in which the sheath holder is fixed relative to the handle member so that movement of the spool moves the first and second extending members longitudinally relative to the first and second sheaths.

In addition, the present disclosure relates to a method for treating tissue which includes inserting to a target area in a body lumen, a clip mounted over an adapter, the clip being maintained in an insertion configuration in which jaws of the clip are separated from one another by the adapter; drawing tissue into a channel of the adapter and between jaws of the clip; moving the clip distally off of the adapter to permit the clip to move from the insertion configuration to an initial deployed configuration by advancing distally extending members releasably coupled to the clip, the jaws of the clip being biased toward the initial deployed configuration in which the jaws extend toward one another to grip the tissue drawn into the adapter, a distal end of each of the extending members being pivotally and releasably coupled a corresponding one of the jaws, the distal end of each of the extending members being connected to a remaining length thereof via a releasable link; and drawing the adapter proximally away from the clip while the clip remains coupled to the extending members to a review configuration.

In an embodiment, when it is determined that the clip requires repositioning, drawing the extending members proximally relative to the endoscope until the clip is drawn proximally over the adapter toward the open insertion configuration to open the clip jaws to free the clip from previously clipped tissue, and repositioning the clip over the target tissue.

In an embodiment, the method further includes moving the clip from the review configuration toward a final deployed configuration by drawing the extending members proximally relative to the endoscope while preventing the clip from opening over the adapter by abutting sheaths surrounding the extending members against the clip until a force exerted on the extending members exceeds a predetermined threshold force separating the distal ends of the extending members from remaining lengths of the extending members to release the clip.

In an embodiment, distal ends of the sheaths are positioned immediately proximal of the clip so that the sheaths are moved together with the extending members to move the clip between the insertion configuration, the initial deployed configuration and the review configuration.

In an embodiment, moving the clip toward the final deployed configuration includes moving the sheaths distally relative to the adapter until the distal ends are positioned against a surface of the clip.

BRIEF DESCRIPTION

DETAILED DESCRIPTION

The present disclosure may be further understood with reference to the following description and the appended drawings, wherein like elements are referred to with the same reference numerals. The present disclosure relates to a clipping system and, in particular, relates to an over-the-scope endoscopic clipping system, in which an initial placement of a clip may be viewed and adjusted prior to a final deployment thereof. Exemplary embodiments of the present disclosure comprise a clip mountable over a distal end of an endoscope via an adapter and releasably coupled to extending members so that the clip may be moved relative to the adapter between an insertion configuration, an initial deployed configuration, and a review configuration, in which the clip can be viewed via the endoscopic viewing system prior to being finally deployed.

According to an exemplary embodiment, a distal end of each of the extending members is coupled to a corresponding jaw of the clip. Each extending member includes a frangible link between the distal end and a remaining length thereof that is configured to break, fail or otherwise separate when subject to a force exceeding a predetermined threshold force so that, during a final deployment of the clip, the frangible link breaks or separates to release the clip from extending members. In an exemplary embodiment, the distal ends of the extending members are coupled to the clip so that, upon breaking or separating of the frangible link, the distal ends of the extending members remain attached to the clip, preventing any shed parts during the final deployment, while the remaining lengths may be removed from the body. As will be understood by those of skill in the art, some current clip designs create shed parts during the deployment process of separating the clip from the catheter so that shed parts are left to pass through the GI tract naturally. As larger defect cases become more prevalent, some physicians may prefer clips that do not generate shed parts to eliminate the possibility of shed parts becoming closed in the defects.

While the extending members are coupled to the clip—e.g., the frangible link remains intact since a force applied thereon does not exceed the predetermined threshold value—the extending members may be moved longitudinally relative to the endoscope to move the clip between the insertion configuration, the initial deployed configuration and the review configuration. In the insertion configuration, the clip is mounted over the adapter in a proximal position maintained in the insertion configuration ready to receive tissue between jaws thereof while the clip's position minimizes its occlusion of the field of view of the endoscopic vision system. The insertion configuration is configured to facilitate insertion of the endoscope to a target site adjacent to tissue to be clipped while the system allows the clip to be deployed and clipped over tissue in an initial deployed configuration. The device permits the endoscope to be withdrawn proximally away from the clip and the tissue over which it is clipped while the clip remains coupled to the device in a review configuration.

As the endoscope is withdrawn proximally while the clip remains in place over the target tissue, the field of view of the vision system of the endoscope widens to show the clip and the tissue clipped thereby so that the operator can determine whether the position of the clip is desirable or in need of adjustment. If the operator determines that the clip is positioned as desired, the clip is deployed by releasing the clip from the clasps of the extending members and left in place clipped over the target tissue. If the operator determines that the position of the clip needs adjustment, the endoscope and the adapter coupled thereto are moved distally to a position adjacent to the clip. The clip is then drawn proximally over the adapter to reopen the clip which is drawn proximally over the distal end of the adapter forcing the clip to open against its natural bias as the clip slides proximally back over the adapter to return to the insertion configuration.

After the clip has been removed from the tissue and returned to the insertion configuration, the operator can re-position the endoscope and device as desired, draw target tissue into the adapter (e.g., under suction or a grasper applied via a working channel of the endoscope) and once more deploy the clip from the adapter over the target tissue in the initial deployed position. The endoscope is then withdrawn proximally once again as the clip remains coupled to the device so that the device moves again into the review configuration. The position of the clip and the clipped tissue are again observed and, this process may be repeated until the clip is positioned as desired. When the operator sees that the tissue over which the clip is closed is the desired portion of tissue, the frangible link of the extending members may be broken to release the clip therefrom, toward the final deployed configuration. It will be understood by those of skill in the art that terms proximal and distal, as used herein, are intended to refer to a direction toward and away from, respectively, a user of the device.

As shown in FIGS. 1-14, a clipping system 100 for treating tissue defects and/or perforations according to an exemplary embodiment comprises a clip 102 configured to be inserted through, for example, a body lumen to a target area to clip a target tissue thereof. The clip 102 is insertable to the target area via an insertion device 104 including, for example, an endoscope 106. As shown in FIGS. 1-4, the clip 102 is coupled to a distal end 108 of the endoscope 106 via an adapter 110, which is mounted over the distal end 108 of the endoscope 106. The clip 102 is configured to be moved relative to the adapter 110 and the endoscope 106 via extending members 112, to which the clip 102 is releasably coupled. The clip 102 is movable from an insertion configuration to an initial deployed configuration and from the initial deployed configuration to a review configuration.

If the user desires, the clip 102 may be moved from the review configuration back to the insertion configuration and then moved to the initial deployed configuration in a new position. When the user is satisfied that the clip 102 is positioned as desired, the clip 102 may be moved from the initial deployed configuration to a final deployed configuration in which the clip 102 is separated from the rest of the system 100 so that it may be left in place clipped over desired tissue while the rest of the system 100 is withdrawn from the body.

Figure 5:
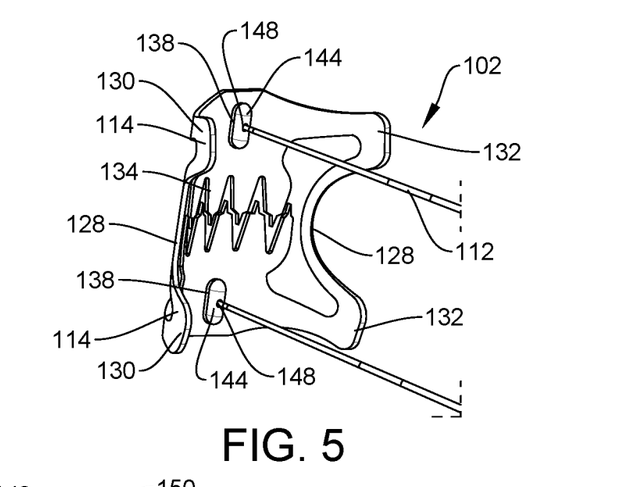
FIG. 5 shows a perspective view of a clip and extending members according to the exemplary clipping system of FIG. 1.
Figure 6:
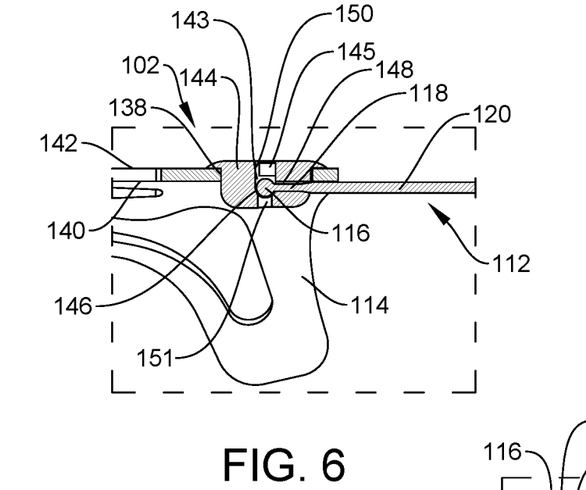
FIG. 6 shows a cross-sectional view of the clip and extending members of FIG. 5, in a first position.
Figure 7:
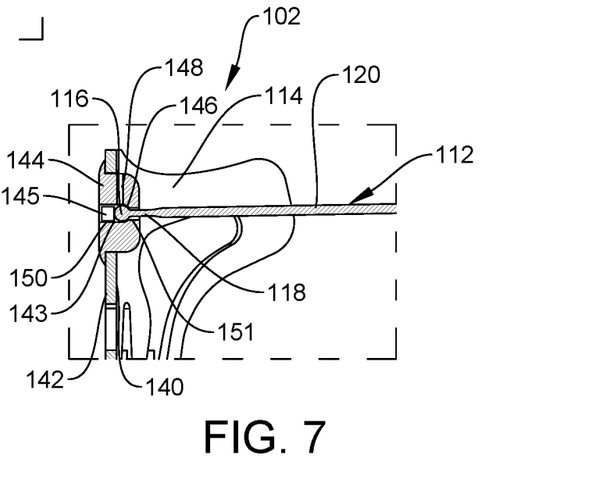
FIG. 7 shows a cross-sectional view of the clip and extending members of FIG. 5, in a second position.
Figure 8:
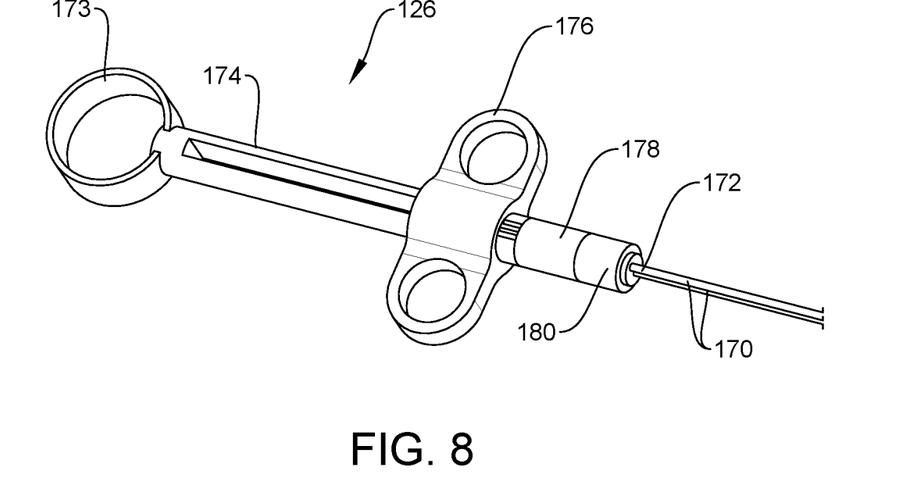
FIG. 8 shows a perspective view of a user interface according to the exemplary clipping system of FIG. 1.
Figure 9:
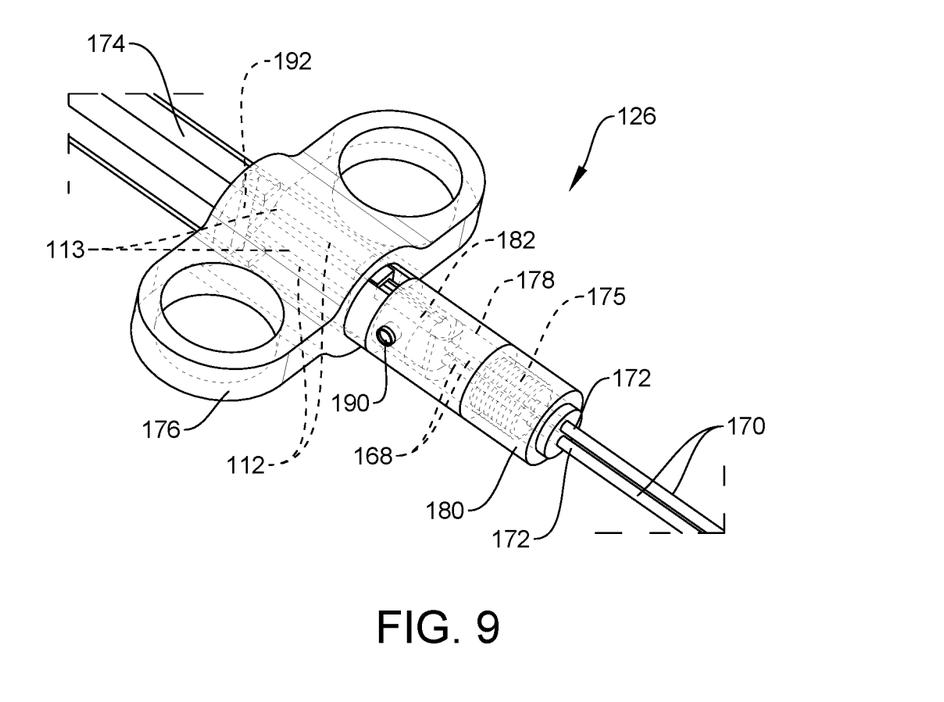
FIG. 9 shows a transparent perspective view of the user interface of FIG. 8.
Figure 10:
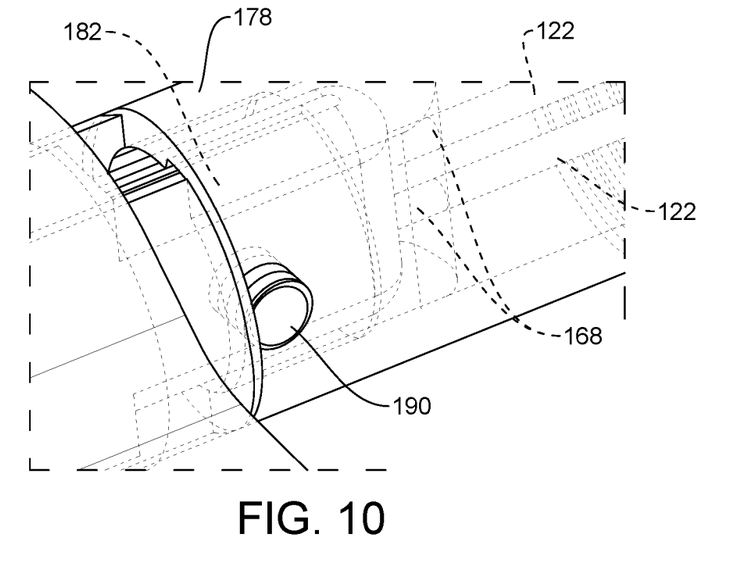
FIG. 10 shows an enlarged, transparent perspective view of a portion of the user interface of FIG. 8, a rotating knob thereof in an unlocked configuration.
Figure 11:
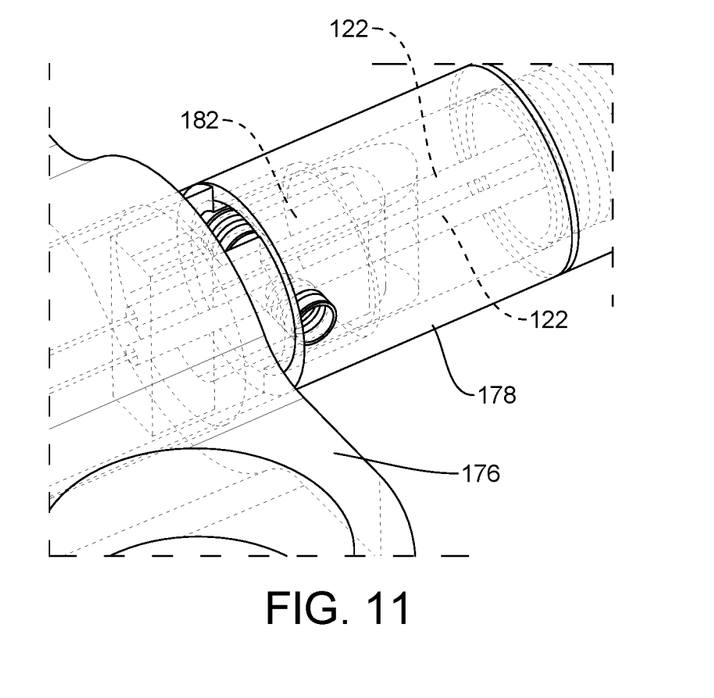
FIG. 11 shows an enlarged, transparent perspective view of a portion of the user interface of FIG. 8, a rotating knob thereof in a locked configuration.

In an exemplary embodiment, as shown in FIGS. 5-7, each of the extending members 112 includes an enlarged distal end 116 coupled to a corresponding jaw 114 of the clip 102. Each extending member 112 includes a frangible link 118 connecting the enlarged distal end 116 to a remaining length 120 of the extending member 112. The frangible link 118 is configured to break, fail, or otherwise separate when a force applied thereto exceeds a predetermined threshold value to release the clip 102 therefrom to the final deployed configuration.

While the frangible link 118 remains intact, however, longitudinal movements of the extending members 112 relative to the endoscope 106 move the clip 102 between the insertion configuration, the initial deployed configuration, and the review configuration. In the insertion configuration, the clip 102 is mounted over the adapter 110 with jaws 114 separated from one another to receive tissue therebetween. To move the clip 102 from the insertion configuration toward the initial deployed configuration, the extending members 112 are moved distally relative to the endoscope 106, permitting the clip 102 to be moved distally off the adapter 110 toward a closed configuration, in which the jaw 114 are moved toward one another to grip tissue that was previously drawn into the adapter 110 (i.e., while the clip 102 is in the insertion configuration).

After tissue has been clipped by the jaws 114 by moving the clip 102 to the initial deployed configuration, the clip 102 may be moved toward the review configuration by moving the extending members 112 distally relative to the endoscope 106 while drawing the endoscope 106 proximally relative to the extending members 112 so that the clip 102 remains in place clipped over the tissue while the distal end of the endoscope 106 and the adapter 110 are spaced from the clip 102. In this configuration, the clip 102 remains tethered to the insertion device 104 via the extending members 112 while the field of view of the endoscope vision system relative to the clip 102 and the target tissue is widened while also allowing for movement of the endoscope 106 relative to the clip 102 to enable more extensive observation of the placement and/or position of the clip 102 relative to the target tissue.

As described below, if the user determines the position of the clip 102 is incorrect or sub-optimal, the user may move the endoscope 106 distally to a position adjacent to the clip 102 by sliding the endoscope 106 over the extending members 112. The extending members 112 may then be withdrawn proximally while holding the endoscope 106 in position to retract the clip 102 over the distal end of the adapter 110. This forces the clip 102 open releasing the previously clipped tissue and returns the clip 102 to the insertion configuration. The user may then reposition the endoscope 106 and the clip 102 and repeat these steps to adjust the placement and/or position of the clip 102 relative to a target tissue as desired, prior to a final deployment of the clip 102. That is, if the operator determines in the review configuration that the clip 102 is not positioned as desired, the clip 102 may be re-opened and removed from the tissue so that the device can be re-positioned until the clip 102 is closed over the desired portion of tissue.

At least a distal portion of each of the extending members 112 is sheathed in a surrounding member such as an inner sheath 122 (formed in an illustrative embodiment as a coil surrounding its corresponding extending member 112) that is movable proximally and distally relative to the endoscope 106 either in concert with the corresponding extending member 112 or relative to the corresponding extending member 112. That is, the inner sheath 122 may be slid proximally or over the corresponding extending member 112 to change the relative positions of these elements or, they may be moved together to be used in cooperation to jointly move the clip 102 between the insertion, initial deployed and review configurations.

Then, when it is desired to finally deploy the clip 102, the inner sheaths 122 are advanced distally over the extending members 112 until the distal ends of the inner sheaths 122 abut the clip 102. At this point, the user draws the extending members 112 proximally while holding the positions of the inner sheaths 122 constant. This applies increasing tension to the extending members 112 until a force exerted on the extending members 112 exceeds a predetermined threshold force at which an enlarged distal end 116 of each of the extending members 112 is separated from the remaining lengths 120 of the extending members 112.

At this point, the clip 102 is fully released from the insertion device 104 deploying the clip 102 in the body while freeing the rest of the system 100 for withdrawal from the body. As will be understood by those of skill in the art and as will be described in further detail below, movement of the clip 102 between the insertion configuration, the initial deployed configuration, the review configuration, and the final deployed configuration via a user interface 126 which, in one embodiment, as shown in FIGS. 8-14, is coupled to a proximal end of the endoscope 106.

As shown in FIG. 5, the clip 102 includes two jaws 114 connected to one another via hinges 128. In one embodiment, each of the jaws 114 extends along a curve from a first end 130 to a second end 132 so that a first one of the hinges 128 connects the first ends 130 of each of the jaws 114 to one another, while a second one of the hinges 128 connects the second ends 132 of each of the jaws 114 to one another. In one embodiment, the hinges 128 are spring biased, biasing the jaws 114 toward the initial deployed configuration in which the jaws 114 are moved toward one another, in a closed configuration. Each of the jaws 114 of this embodiment includes gripping features 134 such as, for example, teeth, so that, in this initial deployed configuration, the gripping features 134 of one of the jaws 114 intermesh with the gripping features 134 of the other jaw 114 to enhance a hold of the clip 102 on the clipped tissue. In particular, in the initial deployed configuration, the jaws 114 extend toward one another so that the target tissue may be gripped between the jaws 114 via the gripping features 134.

However, when the clip 102 is mounted over the adapter 110 in the insertion configuration, the jaws 114 extend about opposing portions of the adapter 110 so that an exterior surface 136 of the adapter 110 maintains the clip 102 in an open configuration, with the jaws 114 separated from one another. Thus, when the clip 102 is mounted over the adapter 110, target tissue may be drawn into a lumen in the adapter 110 so that it is received between the jaws 114. When the clip 102 is moved distally off of the adapter 110, the clip 102 closes under the natural bias of the hinges 128 over the tissue that had been drawn into the adapter 110.

It will be understood by those of skill in the art that the hinges 128 and/or jaws 114 of the clip 102 may be formed of any of a variety of materials so long as the hinges 128 bias the jaws 114 toward the initial deployed configuration, as described above, and so that the bias is sufficiently strong to maintain the clip 102 in clipped position over target tissue after the clip has been finally deployed. In one example, portions of the clip 102 (e.g., the hinges 128) are formed of a shape memory alloy such as, for example, Nitinol to provide and/or add to the bias toward the closed configuration.

According to an exemplary embodiment, each of the jaws 114 includes an opening 138 extending through the clip 102 from a first surface 140 of the clip 102 facing toward the adapter 110 to a second surface 142 of the clip 102 facing away from the adapter 110. In one embodiment, the opening 138 of each of the jaws 114 is sized, shaped and configured to receive a capsule 144 therein. Each of the capsules 144 of this embodiment is configured to pivotally receive therein the enlarged distal end 116 of a corresponding one of the extending members 112. In one embodiment, the opening 138 extends through each of the jaws 114 midway between the first and the second ends 130, 132 so that the openings 138 extend through opposing portions of the clip 102.

Each capsule 144 is sized, shaped and configured to be received within and affixed to a corresponding one of the openings 138. In one embodiment, the capsule 144 may be affixed within the opening 138 via any of a variety of mechanisms including, but not limited to, welding, mechanical coupling or an adhesive. The capsule 144 is formed to include a socket 146 within which the enlarged distal end 116 of the extending member 112 is pivotally received. In an exemplary embodiment, the capsule 144 includes a channel 143 extending therethrough along a central axis which, in one embodiment, extends substantially perpendicular to the first and second surfaces 140, 142 of the clip 102.

The channel 143 is in communication with the socket 146 so that each of the extending members 112 may be assembled with a corresponding one of the capsules 144 by inserting a proximal end 113 of the extending member 112 into a distal opening 150 of the channel of the capsule 144 and threading the extending member 112 therethrough until the enlarged distal end 116 is seated within the socket 146. The remaining length 120 extends proximally from the capsule 144 through a proximal opening 151 of the channel 143. It will be understood by those of skill in the art that while the distal opening 150 of this embodiment is sized and shaped to permit insertion of the enlarged distal end 116 therethrough, the proximal opening 151 is sized and shape to prevent the passing of the distal end 116 therethrough.

As would be understood by those skilled in the art, this may be achieved by making the opening smaller in at least one dimension than the corresponding distal end 116. Thus, the enlarged distal end 116 is prevented from passing through the proximal end and is instead seated within the socket 146 so that proximally directed forces applied to the extending members 112 do not draw the distal ends 116 out of the capsules 144 permitting the application of proximal forces to the clip 102 via the extending members 112.

In an exemplary embodiment, the capsule 144 also includes a slot 148 extending laterally from the socket 146 to an exterior of the capsule 144 so that the slot 148 is in communication with both the socket 146 and the proximal opening 151. The slot 148 is configured to facilitate pivoting of the extending member 112 relative to the capsule 144. In particular, as the enlarged distal end 116 is pivoted within the socket 146 of the capsule 144, the remaining length 120 of the extending member 112 moves along the slot 148, between a first position, as shown in FIG. 6, and a second position, as shown in FIG. 7.

As those skilled in the art will understand, this permits the jaws 114 to rotate between the insertion configuration (in which the jaws extend substantially parallel to the extending members 112) and the initial deployed configuration (in which the jaws are substantially perpendicular to the extending members 112). In the first position, the jaws of the clip 102 are mounted over the adapter 110 so that portions of the extending members 112 extend along the first surface 140 of the clip 102. In the second position, the jaws 114 of the clip 102 have been moved toward the closed configuration so that the extending members 112 are substantially aligned with a central axis along which the distal opening 150 and the proximal opening 151 of the capsule 144 extend.

A width of the slot 148 (i.e., a distance between longitudinally extending edges of the slot 148) is configured so that, while a portion of the remaining length 120 of the extending member 112 is movable therealong, the enlarged distal end 116 is prevented from passing therethrough. In one embodiment, the capsule 144 may further include a cap, plug or other seal 145 for closing the distal opening 150 of each of the capsules 144 upon assembly of the extending members 112 therewith. Thus, upon the breaking or separating of the frangible link 118 of the extending member 112, the enlarged distal end 116 remains trapped within the socket 146 of the capsule 144, preventing any shed parts during a final deployment of the clip 102.

As discussed above, the clip 102 is mounted to the insertion device 104, which may be, for example, any standard endoscope 106. The clip 102 in this embodiment is mounted to the endoscope 106 via the adapter 110, which is sized, shaped and configured to be mounted over the distal end 108 of the endoscope 106. As will be understood by those of skill in the art, the endoscope 106 is configured to be inserted through a body lumen to a target area within the lumen and thus, must be sufficiently flexible to navigate through even tortuous paths of the body lumen. The adapter 110 extends from a proximal end 152 to a distal end 154 and includes a channel 156 extending therethrough.

A proximal portion 153 of the adapter 110 is configured to be mounted over the distal end 108 of the endoscope 106 while a distal portion 155 of the adapter 110 is configured to receive the clip 102 thereover in the insertion configuration. The proximal portion 153 of the adapter 110 may be mounted to the endoscope 106 via, for example, a friction fit, so that the channel 156 of the adapter 110 is substantially longitudinally aligned with a distal end of the endoscope 106. Thus, tissue may be viewed through the channel 156 via an optical system of the endoscope 106. In another embodiment, to enhance a visibility of the tissue and/or the clip 102, the adapter 110 is formed of a transparent material.

In one embodiment, the proximal portion 153 of the adapter 110 includes a pair of holes 158 extending longitudinally through a wall 160 thereof. Each of the holes 158 is configured to slidably receive a corresponding one of the inner sheaths 122 therein with the extending members 112 extending through the inner sheaths 122 to be coupled to the clip 102. As will be described in further detail below, the extending members 112 extend through the inner sheaths 122 so that the enlarged distal ends 116 extend distally beyond the distal ends 124 of the inner sheaths 122 to be coupled to the clip 102 via the capsule 144.

An outer diameter of the distal portion 155 of the adapter 110 is sized, shaped and configured to receive the clip 102 thereover when the jaws 114 are stretched apart from one another in the insertion configuration. In one exemplary embodiment, the distal portion 155 tapers toward the distal end 154 so that the bias of the clip 102 urging the clip 102 closed aids in moving the clip 102 distally off of the adapter 110 to assume the initial deployed configuration. When the clip 102 is mounted on the distal portion 155 of the adapter 110, with the jaws 114 extending over opposing portions of the adapter 110, the exterior surface 136 of the adapter 110 pushes the jaws 114 of the clip 102 radially outward maintaining the jaws 114 open in the insertion configuration (i.e., the jaws 114 are held open against their natural bias by the adapter 110).

The clip 102 of this embodiment remains mounted over the adapter 110 in the open insertion configuration so long as a sufficient proximally directed tension is applied to the extending members 112 with the clasps engaging the clip 102 to hold the clip 102 in place. When this tension is removed from the extending members 112 or the extending members 112 are extended distally relative to the adapter 110, the natural bias of the clip 102 draws the jaws 114 toward one another over the taper of the distal portion 155 pushing the clip 102 distally over the adapter 110 until the clip 102 slides distally off of the adapter 110. When the jaws 114 move distally past the distal end of the adapter 110, they are freed to close under their natural bias clipping any tissue that had been drawn into the adapter 110.

Figure 1:
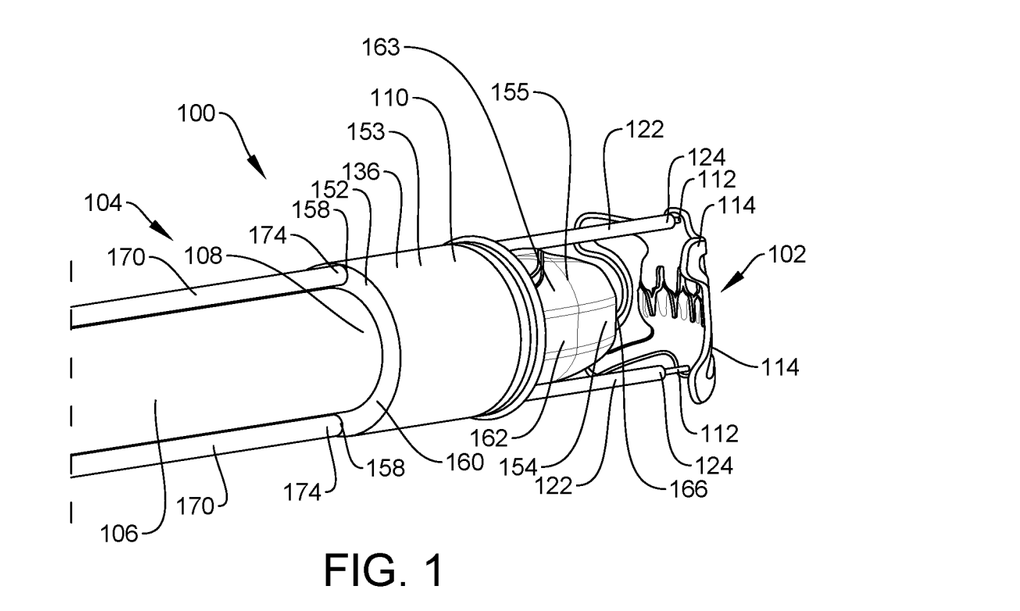
FIG. 1 shows a perspective view of a distal portion of a clipping system according to an exemplary embodiment of the present disclosure.
Figure 2:
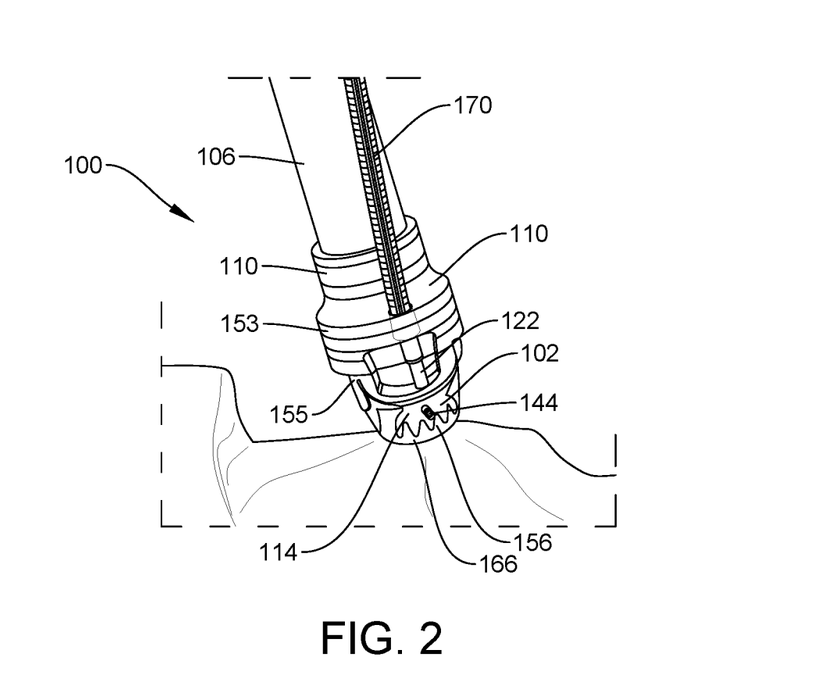
FIG. 2 shows a perspective view of the distal portion of the clipping system of FIG. 1, in an insertion configuration.
Figure 3:
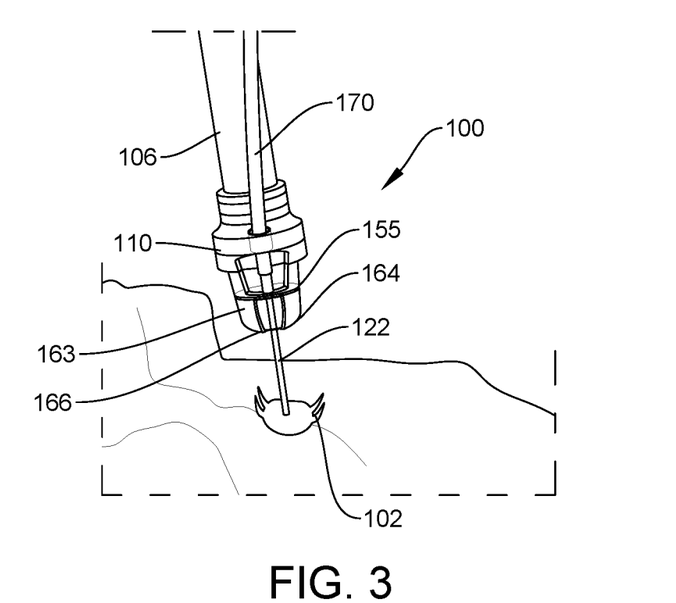
FIG. 3 shows a perspective view of the distal portion of the clipping system of FIG. 1, in a review configuration.
Figure 4:
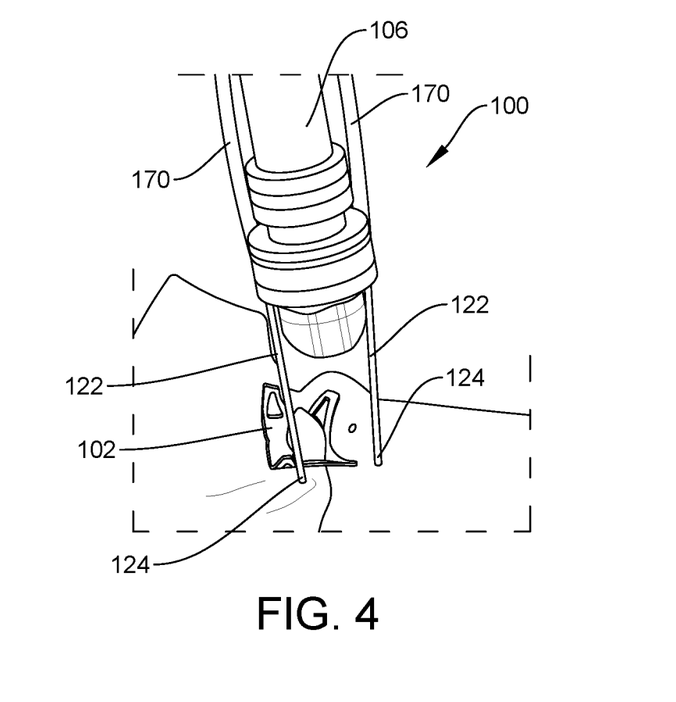
FIG. 4 shows a perspective view of the distal portion of the clipping system of FIG. 1, toward a final deployed configuration.

As shown in FIG. 4, the distal portion 155 of the adapter 110 of this embodiment includes a plurality of longitudinally extending flat portions 162 distributed about the circumference of the exterior surface 136 of the adapter 110. Each of the flat portions 162 extends along at least portion of a length of the distal portion 155 and covers a portion of a perimeter (e.g., circumference) of the distal portion 155. The flat portions 162 may be equally sized and separated from one another about the circumference of the distal portion 155 or varied in size and length as desired. It will be understood by those of skill in the art that these flat portions 162 reduce friction between the clip 102 and the distal portion 155 of the adapter 110 to facilitate movement of the clip 102 between the insertion and initial deployed configurations.

The distal portion 155 of the adapter 110 of this embodiment also includes a plurality of optional projections 164 extending radially into the channel 156 of the adapter 110 at the distal end of the adapter 110. In one embodiment, the projections 164 extend from curved portions 163 of the distal portion 155, which extend between adjacent flat portions 162. In one exemplary embodiment, a distal face 166 of each of these curved portions 163 is angled with respect to a longitudinal axis of the adapter 110 so that, when the clip 102 is drawn proximally from the initial deployed configuration until the jaws 114 abut the distal face 166, the angles of these projections 164 act as ramps facilitate the re-opening of the jaws 114 against their natural bias, toward the open insertion configuration. That is, the jaws 114 slide proximally over the projections 164 to re-open the jaws 114 so that the clip 102 is released from the clipped tissue and can be slid proximally back over the adapter 110.

The insertion device 104 includes a pair of inner sheaths 122 extending, in this embodiment, along a full length of the endoscope 106 from proximal ends 168 that remain outside the body accessible to the user via, for example, the user interface 126, to the distal ends 124 that extend over the adapter 110. Each of the inner sheaths 122 in this embodiment is configured as a nitinol hypotube, a plastic tube or have any of a variety of coiled and/or substantially tubular structures so long as the inner sheaths 122 extend over the extending members 112.

Each of the inner sheaths 122 in this embodiment, extends through, for example, an outer shaft 170 extending along a length of the endoscope 106 from a proximal end 172 connected to a portion of the user interface 126 to a distal end 124 connected to the adapter 110. In particular, the distal ends 124 of the outer shafts 170 are connected to the proximal end 152 of the adapter 110 so that each outer shaft 170 is aligned with a corresponding one of the holes 158 of the adapter 110. Thus, each inner sheath 122 extends through a corresponding one of the outer shafts 170 and the holes 158 so that each inner sheath 122 is longitudinally movable through its corresponding outer shaft 170, relative to the endoscope 106.

The extending members 112 are received within the inner sheaths 122 and extend from proximal ends 113 connected to the user interface 126 to the enlarged distal ends 116, which extend distally of the distal ends 124 of the inner sheaths 122. As described above, each of the enlarged distal ends 116 is coupled to the clip 102 via a corresponding capsule 144. In an exemplary embodiment, the enlarged distal ends 116 are substantially ball-shaped with a size and shape of each of the enlarged distal ends 116 substantially corresponding to the size and shape of the socket 146 within which it is received. Thus, the enlarged distal ends 116 are permitted to pivot within the sockets 146 so that the extending members 112 may be pivoted relative to the clip 102 between the first position and the second position. In an exemplary embodiment, the frangible link 118 is configured as a reduced diameter portion immediately proximal of the enlarged distal end 116, which is designed to fail, break or otherwise separate when a force exerted thereon exceeds the predetermined threshold force.

It will be understood by those of skill in the art, however, that the frangible link 118 may include any of a variety of connections configured to break, fail or otherwise separate. In addition, although the exemplary embodiments show and describe the frangible link 118 as frangible, it will be understood by those of skill in the art that the frangible links 118 between the enlarged distal ends 116 and the remaining lengths 120 may include any of a number of couplings and/or connections so long as each frangible link 118 is configured to separate or release the corresponding enlarged distal end 116 from the remaining length 120 of the corresponding extending members 112 during final deployment of the clip 102.

In one exemplary method, the inner sheaths 122 and the extending members 112 are moved together, simultaneously to move the clip 102 between the insertion configuration, the initial deployed configuration and the review configuration. In this method, the distal ends 124 of the inner sheaths 122 are positioned immediately proximal of the first surface 140 of the clip 102. Thus, when it is desired to move the clip 102 toward the final deployed configuration, the extending members 112 are drawn proximally relative to the inner sheaths 122, so that the clip 102 is drawn proximally against the distal ends 124 of the inner sheaths 122 applying tension to the extending members 112. When this tension exceeds the predetermined threshold value, the frangible link 118 breaks, fails, or otherwise separates to release the clip 102 from the remaining lengths of the extending members 112 completely separating the clip 102 from the rest of the system 100.

In another exemplary method, the clip 102 is moved between the insertion configuration, the initial reviewed configuration and the review configuration via movement of the extending members 112 relative to the endoscope 106 and relative to the inner sheaths 122 which are held immobile until the user is ready to finally deploy the clip 102. In this method, after the user has determined that the clip 102 is closed over a desired portion of tissue and is ready for final deployment, the inner sheaths 122 are moved distally relative to the extending members 112 until the distal ends 124 of the inner sheaths 122 abut the capsules 144 of the proximal side of the clip 102. Then, similarly to the embodiment described above, the extending members 112 are drawn proximally relative to the inner sheaths 122 so that the clip 102 is drawn proximally against the distal ends 124 of the inner sheaths 122 until the resulting tension on the extending members 112 exceeds the predetermined threshold value. At this point, the frangible link 118 may break, fail, or otherwise separate to release the clip 102 from the remaining length thereof. Those skilled in the art will understand that the inner sheaths 122 must have a column strength sufficient to oppose the proximally directed forces applied to the extending members 112 until the threshold level is exceeded.

In one embodiment, the outer shafts 170 (and the inner sheaths 122 and the extending members 112) extend along opposing longitudinal sides of the endoscope 106 (i.e., in this embodiment, the outer shafts 170 are diametrically opposed to one another). Each of the outer shafts 170 in this embodiment is substantially longitudinally aligned with one of the holes 158 of the adapter 110 and one of the openings of a corresponding one of the jaws 114 so that, when the clip 102 is mounted over the adapter 110, the inner sheaths 122 extend distally from the holes 158 of the adapter 110 and the extending members 112 extend distally from the inner sheaths 122 to releasably engage the jaws 114 of the clip 102. It will be understood by those skilled in the art, however, that any arrangement of the outer shafts 170 may be employed so long as the extending members 112 are slidably housed therein and are delivered to desired locations on the clip 102 as described above.

According to an exemplary embodiment, as shown in FIGS. 8-14, the user interface 126 includes a handle member 174, a spool 176 configured to control the movement of the extending members 112 relative to the endoscope 106 and a rotating knob 178 configured to control the movement of the inner sheaths 122 relative to the endoscope 106. Although not shown, a proximal end of the endoscope 106 (or other insertion device 104) is connected to the handle member 174. The spool 176 is connected to proximal ends 113 of the extending members 112 and the rotating knob 178 interfaces with proximal ends 168 of the inner sheaths 122 to control the movement thereof. The proximal ends 172 of the outer shafts 170 in this embodiment are connected to the handle member 174 via a cap 180 mounted to a distal end 175 thereof.

The handle member 174 which is configured for gripping by the user extends longitudinally from a proximal end 173 and to a distal end 175. The distal end 175 of this embodiment includes threading for threadedly engaging the cap 180. A distal portion of the handle member 174 also includes an opening 188 extending through a wall thereof, the opening 188 housing a pin 190 therein. In an exemplary embodiment, the pin 190 is biased toward a radially outward position in which the pin 190 extends radially outward past an exterior surface of the handle member 174. In one embodiment, the user interface 126 includes a pair of openings 188 through diametrically opposing sides of the handle member 174, each of the openings 188 including a pin 190, as described above.

Figures 12, 13, 14:
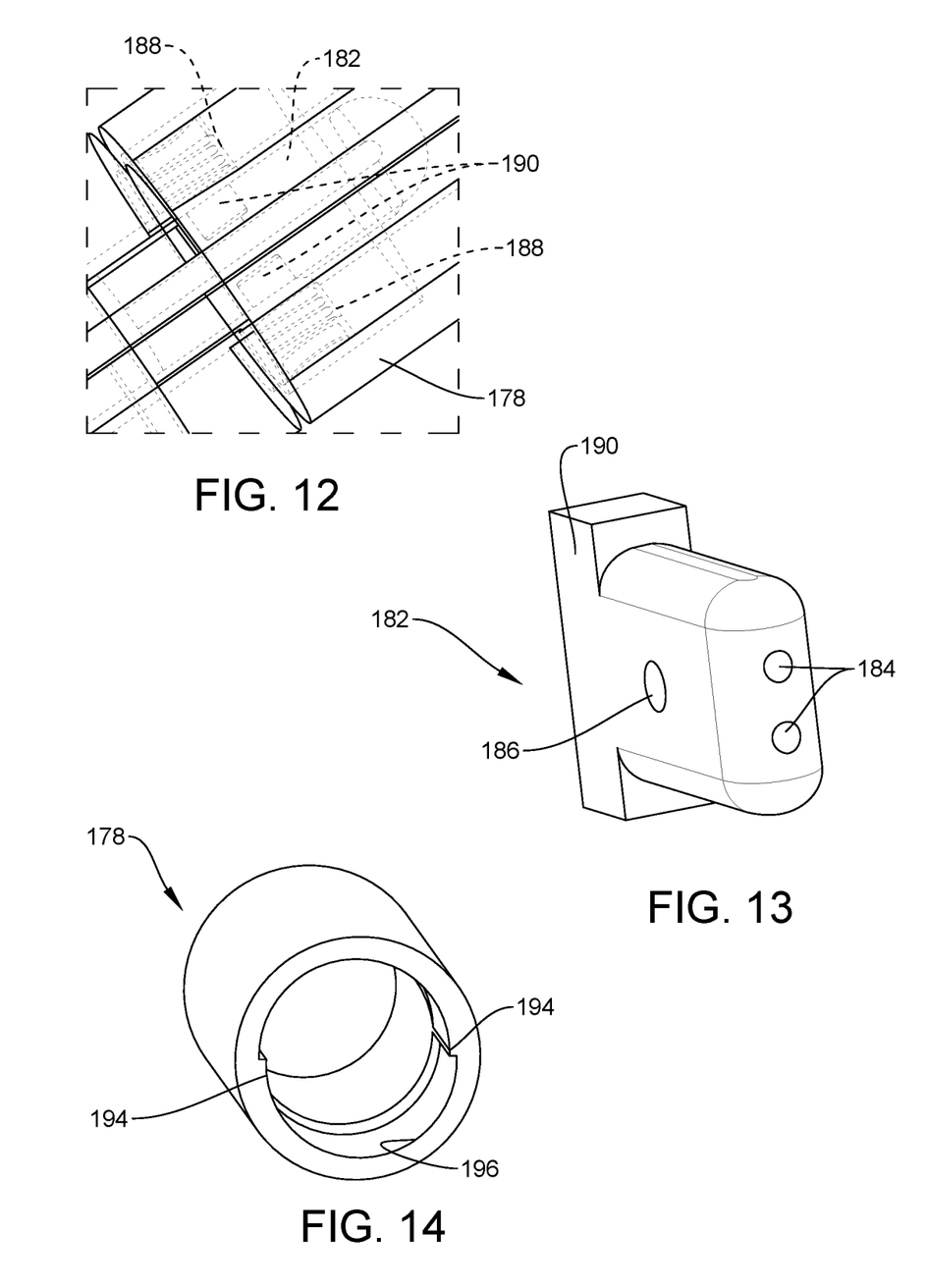
FIG. 12 shows another enlarged, transparent side view of a portion of the user interface of FIG. 8, the rotating knob in the locked configuration.
FIG. 13 shows a perspective view of a coil holder according to the exemplary user interface of FIG. 8.
FIG. 14 shows a perspective view of the rotating knob according to the exemplary user interface of FIG. 8.

The cap 180 of one embodiment includes threading along an interior surface thereof for threadedly engaging the distal end 175 of the handle member 174. The proximal ends 172 of the outer shafts 170 may be attached to an interior of the cap 180 via, for example, a crimp so that threadedly engaging the cap 180 with the handle member 174 engages the outer shafts 170 thereto. Proximal of the cap 180, the handle member 174 slidably houses a coil holder 182. The coil holder 182, as shown in FIG. 13, includes a pair of holes 184 extending longitudinally therethrough and within which the proximal ends 168 of the inner sheaths 122 are fixed. The coil holder 182 is housed within the handle member 174 so that the pair of holes 184 are substantially aligned with the outer shaft 170 attached to the distal end 175 of the handle member 174 via the cap 180. Thus, the inner sheaths 122 extend distally from the coil holder 182 and through the outer shafts 170.

The coil holder 182 also includes an opening 186 extending laterally therethrough. The opening 186 is sized, shaped and configured to receive the pair of pins 190, wherein each of the pins 190 are extendable through opposing sides of the opening 186. The pins 190 are movable between a radially outwardly biased unlocked position (FIG. 10), in which the pins 190 do not engage the coil holder 182, and a locked position (FIGS. 11-12), in which the pins 190 are pushed radially inward, into the opening 186 of the coil holder 182. In the locked position, when the pins 190 are received within the opening 186 of the coil holder 182, the coil holder 182 is fixed relative to the handle member 174 so that the inner sheaths 122 remain stationary relative to the endoscope 106 while the extending members 112 are movable relative thereto during a final deployment of the clip, as will be described in further detail below.

In an exemplary embodiment, the spool 176 is longitudinally movable along the handle member 174. The proximal ends 113 of the extending members 112 are attached to the spool 176 so that longitudinal movement of the spool 176 relative to the handle member 174 correspondingly moves the extending members 112 longitudinally relative to the endoscope 106. The proximal ends 113 may be attached to the spool 176 via any of a variety of mechanisms including, for example, the coil holder 182 affixed to the proximal ends 113 of the extending members 112 and to an interior of the spool 176.

In one embodiment, a proximal end 192 of the coil holder 182 frictionally engages a portion of the spool 176, but is also longitudinally slidable relative thereto. Thus, when the pins 190 are in the unlocked position and do not engage the coil holder 182, frictional engagement between the spool 176 and the proximal end 192 of the coil holder 182 causes a longitudinal movement of the spool 176 relative to the handle member 174 to move both the extending members 112 and the inner sheaths 122 together, simultaneously, relative to the endoscope 106. When the pins 190 are moved toward the locked position to engage the coil holder 182 so that the coil holder 182 is fixed relative to the handle member 174, however, longitudinal movement of the spool 176 relative to the handle member 174 moves the extending members 112 longitudinally relative to the inner sheaths 122 and the endoscope 106.

According to an exemplary embodiment, the pins 190 are moved between the unlocked and locked positions via the rotating knob 178. The rotating knob 178 is rotatably mounted over the handle member 174, proximally of the cap 180. As shown in FIG. 14, the rotating knob 178 of one embodiment is substantially cylindrical and includes a pair of cams 194 positioned along an interior surface 196 of the rotating knob 179 so that, when these cams 194 come into contact with the pins 190, the pins 190 are moved from the unlocked position toward the locked position in which the pins 190 are received within the opening 186 of the coil holder 182, thereby fixing the coil holder 182 relative to the handle member 174 and the endoscope 106.

The user interface 126, as described above, is configured to move the inner sheaths 122 and the extending members 112 together, simultaneously, to move the clip 102 between the insertion configuration, the initial deployed configuration and the review configuration. When it is desired to move the clip 102 to the final deployed configuration, the rotating knob 178 is rotated relative to the handle member 174 to move the pins 190 from the unlocked position to the locked position. Once the coil holder 182 has been locked relative to the handle member 174, the spool 176 may be moved proximally relative to the coil holder 182 to draw the clip 102 proximally against the distal ends 124 of the inner sheaths 122 via the extending members 112.

As also described above, however, in another method, the extending members 112 alone (i.e., without a movement of the inner sheaths 122) are moved relative to the endoscope 106 to move the clip 102 between the insertion configuration, the initial deployed configuration and the review configuration. It will be understood by those of skill in the art that, in this embodiment, rather than the rotating knob 178 which moves the pins 190 between the unlocked and locked positions, the user interface 126 may include an actuator connected to proximal ends 168 of the inner sheaths 122 such that movement thereof relative to the handle member 174 moves the inner sheaths 122 longitudinally relative to the endoscope 106, independently of the spool 176 and the extending members 112.

According to an exemplary method for tissue closure utilizing the clipping system 100, the clip 102 is mounted on an adapter 110 which is, in turn, mounted on the distal end of an endoscope 106. The outer shafts 170 housing the extending members 112 and the inner sheaths 122 are coupled to the endoscope 106 and the endoscope 106 is inserted through a body lumen (accessed, for example, via a naturally occurring bodily orifice) such as, for example, the GI tract, to a target area within the body lumen adjacent to tissue to be clipped.

As described above, during insertion of the endoscope 106 to the target area, the clip 102 is maintained by the adapter 110 in the insertion configuration with the jaws 114 separated from one. When the user notes (e.g., using the vision system of the endoscope 106) that the adapter 110 is adjacent to target tissue, the user draws tissue into the channel 156 of the adapter 110 (e.g., via a grasper or a suction force applied through a working channel of the endoscope 106). The user may then move the clip 102 to the initial deployed configuration by extending the extending members 112 distally relative to the endoscope 10. This releases the force that had been holding the clip 102 in place and actively pushes the clip 102 distally over the adapter 110. As the clip 102 slides distally along the tapered surface of the adapter 110 its jaws 114 gradually close under the natural bias of the clip 102 until the clip 102 moves distally off of the adapter 110 permitting the jaws 114 to close over the tissue that had been drawn into the adapter 110 (i.e., to reach the initial deployed configuration).

It will be understood by those of skill in the art that suctioning and/or gripping of the tissue in this initial deployed configuration may obstruct an imaging/optical lens of the endoscope 106 so that the user is unable to clearly visualize and/or confirm whether a desired target tissue has been properly clipped. Thus, the user may then move the clip 102 to the review configuration by drawing the endoscope 106 proximally relative to the clip 102, while the clip 102 remains engaged with the extending members 112 (i.e., by extending the extending members further distally relative to the endoscope 106 as the endoscope 106 is withdrawn proximally).

As the distance between the adapter 110 and the clip 102 increases the field of view of the endoscope 106 widens and this also permits some freedom of movement of the endoscope relative to the clip 102 so that the user can get a better view of the clip 102 and the clipped tissue. If, upon visualization, the user determines that the clip 102 requires an adjustment and/or a repositioning relative to the target tissue, the user draws the extending members 112 proximally relative to the endoscope 106 while sliding the endoscope 106 distally until the distal end of the adapter 110 is adjacent to the clip 102.

The user then draws the extending members 112 further proximally while holding the endoscope 106 in place. This forces the proximal side of the clip 102 against the distal end of the adapter 110 which forces the jaws 114 to open and release the clipped tissue. The clip 102 is drawn further proximally over the adapter 110 to return the clip 102 to the insertion configuration and the user may inspect the tissue visually and reposition the endoscope 106 until the adapter 110 is positioned as desired adjacent to a portion of tissue to be clipped. The user may then repeat the entire process until the user determines, in the review configuration, that the clip 102 is clipped over target tissue as desired.

In one embodiment, the clip 102 is moved between the insertion configuration, the initial deployed configuration and the review configuration by moving both the extending members 112 and the inner sheaths 122 together, distally relative to the endoscope 106. As described above, the extending members 112 and the inner sheaths 122 may be moved together, simultaneously, via the spool 176 of the user interface 126, so long as the rotating knob 178 is maintained in the unlocked position—e.g., the cams 194 of the rotating knob 178 do not engage the pins 190 and the pins 190 do not extend into the opening 186 of the coil holder 182. Once it has been determined that the clip 102 is clipped over target tissue, as desired, the final deployment process may be initiated by rotating the knob 178 so that cams 194 engage the pin 190, moving them to the locking position.

In the locking position, the inner sheaths 122 are locked relative to the endoscope 106 so proximal movement of the spool 176 moves the extending members 112 proximally relative to the endoscope 106, drawing the clip 102 proximally against the distal ends 124 of the inner sheaths 122. The extending members 112 are drawn proximally until a force exerted thereon exceeds the predetermined threshold force, causing the frangible link 118 to break, fail or otherwise separate to release the clip 102 from the remaining length 120 of the extending members 112. As described above, the enlarged distal end 116 remains trapped within the capsule 144 that is affixed within the opening 138 of each jaw 114.

In another embodiment, the clip 102 may be moved between the insertion configuration, the initial deployed configuration and the review configuration via movement of just the extending members 112 relative to the endoscope 106. Only after it has been determined, during the review configuration, that the clip 102 is clipped over the target tissue as desired, are the inner sheaths 122 moved distally relative to the endoscope 106 so that the distal ends 124 are positioned immediately proximal the first surface 140 of the clip 102. The clip 102 may then be similarly moved to the final deployed configuration by drawing the clip 102 proximally against the distal ends 124 until a force exerted on the extending members 112 exceeds a predetermined threshold value.

Upon movement of the clip 102 toward the final deployed configuration, the insertion device 104, including the remaining length 120 of the extending members 112 and the inner sheath 122, are removed from the body, leaving the clip 102 clipped over the target tissue.

Figure 15:
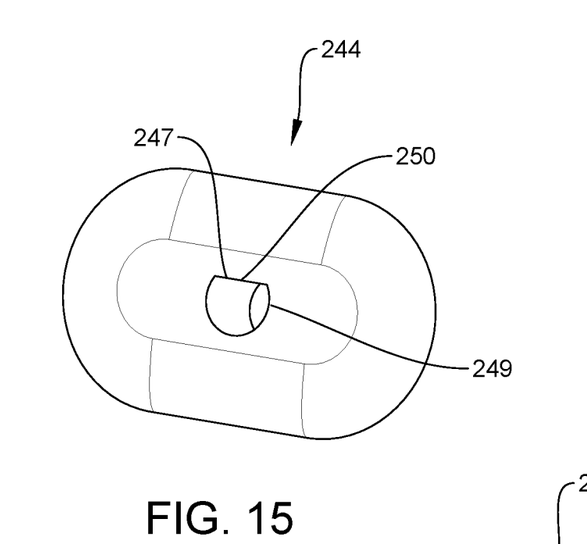
FIG. 15 shows a perspective view of a capsule according to an alternate embodiment of a clipping system of the present disclosure.
Figure 16:
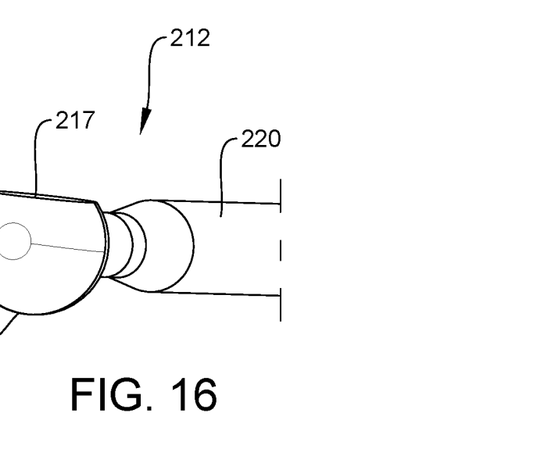
FIG. 16 shows a perspective view of a distal portion of an extending member according to the alternate embodiment of the clipping system of FIG. 15.

According to an alternate embodiment, as shown in FIGS. 15-16, rather than a cap, plug or other seal 145 insertable into the distal opening 150 of the capsule 144 for trapping the enlarged distal end 116 of the extending member 112 upon final deployment of the clip 102, the clip 102 of this embodiment includes a capsule 200 including a distal opening 250 keyed to the shape of an enlarged distal end 216 of an extending member 212 (i.e., permitting the enlarged distal end 216 to pass through the opening 250 only when these elements are in a precise orientation relative to one another).

In one example, the opening 250 includes a flat portion 247 along a portion of a circumference 249 of the opening 250 which corresponds to a flat portion 217 along an exterior, substantially rounded surface 219 of the enlarged distal end 216. The extending member 212 is assembled with the capsule 244 by precisely aligning the flat portions 247, 217. The opening 250 is sized and shaped so that, when the enlarged distal end 216 is in any orientation other than this precise insertion orientation, the enlarged distal end 216 cannot pass through the opening 250. Upon the final deployment of the clip 102, the enlarged distal end 216 is trapped within the capsule 244 as it is extremely unlikely that these elements will assume this precise orientation relative to one another.

As will be understood by those of skill in the art, while this does not eliminate the possibility of the enlarged distal end 216 escaping from the capsule 244 upon separation of the enlarged distal end 216 from the remaining length 220 of the extending member 212, it drastically reduces the likelihood of the enlarged distal end 216 being released from the capsule 244 and practically eliminating the risk that this part will be shed part during the final deployment. It should also be understood by those of skill in the art that other features of the capsule 244 and the extending members 212 with respect to the clip 102 and the system 100 are substantially similar to the capsule 144 and the extending members 112, as described above with respect to the system 100.

Figure 17:
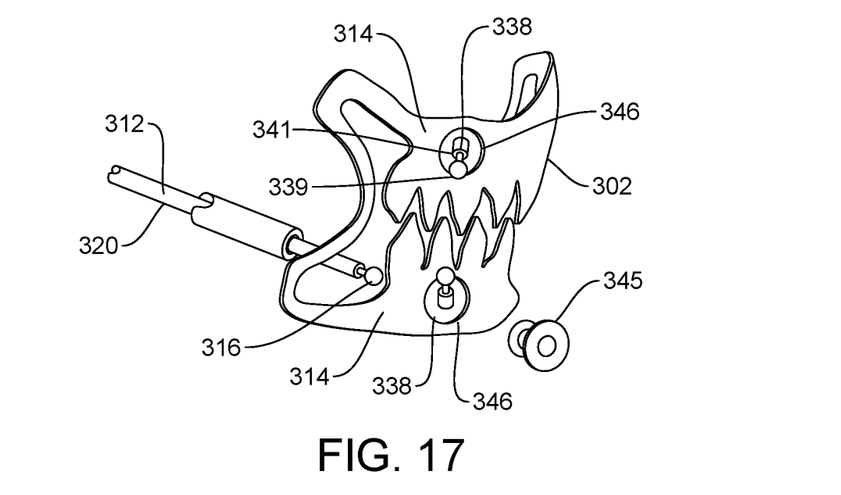
FIG. 17 shows a perspective view of a clip and extending member according to another exemplary embodiment of a clipping system of the present disclosure.

According to yet another exemplary embodiment, rather than including a capsule for coupling the extending member to the clip, an enlarged distal end 316 of an extending member 312 may be directly coupled to an opening 338 of a corresponding jaw 314 of a clip 302. In this embodiment, the opening 338 is configured as a counterbore and/or may include a countersink 346 extending thereabout along a surface 342 of the clip 302 facing away from an adapter in an operative configuration. Thus, upon assembly of the of the extending member 312 with the clip 302, the enlarged distal end 316 is pivotally seated in the opening 338 so that a remaining length 320 of the extending member 312 extends proximally therefrom.

In one embodiment, the opening 338 has a keyhole shape so that the extending member 312 may be assembled therewith by inserting the enlarged distal end 316 through a first portion 339 sized and shaped to permit passage of the enlarged distal end 316 therethrough and moved laterally toward a second portion 341 sized and shaped to prevent the passage of the enlarged distal end 316. Once the enlarged distal end 316 has been moved toward the second portion 341, the enlarged distal end 316 is seated within the countersink. The clip 302 of this embodiment further includes a cap, plug of other seal 345 which may be received within the countersink 346 over the enlarged distal end 316 so that, upon separation of the enlarged distal end 316 from the remaining length 320 during a final deployment of the clip 302, the enlarged distal end 316 remains trapped within the clip 302, preventing any shed parts.

It will be apparent to those skilled in the art that various modifications may be made in the present disclosure, without departing from the scope of the disclosure. Furthermore, those skilled in the art will understand that the features of any of the various embodiments may be combined in any manner that is not inconsistent with the description and/or the functionality of the embodiments.

What is claimed is:

1. A clipping system for treating tissue, comprising:
   an adapter including a proximal portion configured to be mounted over a distal end of an insertion device and a distal portion extending distally from the proximal portion;
   a clip configured to be mounted over the distal portion of the adapter, the clip including first and second jaws connected to one another such that the first and second jaws are movable between an insertion configuration, in which the first and second jaws extend about opposing portions of the distal portion of the adapter and are separated from one another to receive tissue therebetween, and an initial deployed configuration, in which the clip is moved distally off of the adapter so that the first and second jaws are drawn toward one another to grip tissue therebetween, the first and second jaws being biased toward the initial deployed configuration; and
   a first extending member releasably coupled to the clip and movably connected to the adapter, the first extending member including a distal end releasably coupled to the first jaw such that longitudinal movement of the first extending member relative to the adapter moves the clip between the insertion configuration, the initial deployed configuration and to a review configuration in which the adapter is withdrawn proximally away from the clip while the first extending member remains coupled to the clip to enhance visual observation of the clip, the first extending member being operable to retract the clip proximally over the adapter so that the clip is forced open as the clip is retracted over the adapter, a first releasable link connecting the first extending member to the clip, the first releasable link configured to release when the first extending member is subject to a force exceeding a predetermined threshold value.

2. The system of claim 1, wherein the first jaw includes an opening extending therethrough from a first surface of the clip which, in an operative configuration, faces toward the adapter, to a second surface which, in the operative configuration, faces away from the adapter, the opening configured to receive a portion of the first extending member therein.

3. The system of claim 2, further comprising a capsule received within the opening of the first jaw, the capsule including a socket sized, shaped and configured to pivotally receive an enlarged distal end of the first extending member therein, the first extending member being configured to break when the force exerted on the first extending member exceeds a predetermined threshold level, wherein the capsule is configured so that, when the first extending member breaks, the enlarged distal end remains within the capsule.

4. The system of claim 3, wherein the capsule includes a channel extending therethrough along a central axis, in communication with the socket, a distal opening of the capsule being sized and shaped to permit passage of the enlarged distal end of the first extending member therethrough and a proximal opening of the capsule being sized and shaped to prevent a passage of the enlarged distal end of the first extending member therethrough.

5. The system of claim 4, wherein the capsule includes a slot extending from the socket to an exterior thereof, the slot configured to permit a portion of a remaining length of the first extending member to be moved therealong as the first extending member is pivoted from a first position, in which the remaining length extends along the first surface of the clip, toward a second position in which the remaining length extends transverse to the first jaw.

6. The system of claim 5, further comprising a cap configured to cover the distal opening of the capsule so that, upon separation of the enlarged distal end of the first extending member from the remaining length thereof during a final deployment, the enlarged distal end of the first extending member remains trapped within the capsule.

7. The system of claim 5, wherein the opening includes a countersink therearound along the second surface of the clip, the countersink sized, shaped and configured to pivotally receive the enlarged distal end of the first extending member.

8. The system of claim 7, further comprising a cap sized and shaped to cover the countersink along the second surface so that, upon separation of the enlarged distal end of the first extending member from the remaining length of the first extending member during final deployment of the clip, the enlarged distal end remains trapped within the opening of the clip.

9. The system of claim 4, wherein the distal opening of the capsule is keyed to a size and shape of the enlarged distal end of the first extending member.

10. The system of claim 4, further comprising a second extending member releasably coupled to the clip and movably connected to the adapter, the second extending member including an enlarged distal end pivotally coupled to the second jaw such that longitudinal movement of the second extending member relative to the adapter moves the clip between the insertion configuration, the initial deployed configuration and the review configuration, a second releasable link connecting the enlarged distal end of the second extending member to a remaining length of the second extending member, the second releasable link configured to release when the second extending member is subject to a force exceeding a predetermined threshold value.

11. The system of claim 1, further comprising a first sheath extending slidably over the first extending member so that a distal end thereof is configured to be positioned proximally of a first surface of the clip, the clip configured to be drawn proximally against the distal end of the first sheath during a final deployment of the clip.

12. A clipping system for treating tissue, comprising:
an endoscope extending longitudinally from a proximal end to a distal end;
an adapter including a proximal portion configured to be mounted over the distal end of the endoscope and a distal portion extending distally from the proximal portion;
a clip configured to be mounted over the distal portion of the adapter, the clip including first and second jaws connected to one another such that the first and second jaws are movable between an insertion configuration, in which the first and second jaws extend about opposing portions of the distal portion of the adapter and are separated from one another to receive tissue therebetween, and an initial deployed configuration, in which the clip is moved distally off of the adapter so that the first and second jaws are drawn toward one another to grip tissue therebetween, the first and second jaws being biased toward the initial deployed configuration; and
first and second extending members releasably coupled to first and second jaws of the clip, respectively, each of the first and second extending members including a distal end releasably coupled to a corresponding one of the first and second jaws such that longitudinal movement of the first and second extending members relative to the adapter moves the clip between the insertion configuration, the initial deployed configuration and a review configuration, in which the adapter is permitted to be withdrawn proximally away from the clip while the first and second extending members remain coupled to the clip to enhance visual observation of the clip, the first and second extending members being operable to retract the clip proximally over the adapter so that the clip is forced open as the clip is retracted over the adapter, a releasable link connecting the first and second extending members to the clip, the releasable link configured to release when the first and second extending members are subject to a force exceeding a predetermined threshold value.

13. The system of claim 12, further comprising first and second sheaths extending slidably over the first and second extending members, respectively, distal ends of the first and second sheaths being configured to be positioned proximally of a first surface of the clip, the clip configured to be drawn proximally against distal ends of first and second coils during final deployment of the clip.

14. The system of claim 13, further comprising a handle configured to remain outside a living body accessible to a user of the system, the handle including:
a handle member;
a spool mounted slidably over the handle member and connected to proximal ends of the first and second extending members to control movement of the first and second extending members relative to the adapter; and a sheath holder connected to proximal ends of the first and second sheaths and frictionally engaged with a portion of the spool so that, when the sheath holder is unlocked relative to the handle member, longitudinal movement of the spool relative to the handle member moves the first and second extending members, and the first and second sheaths together.

15. The system of claim 14, wherein a user interface further includes a rotating knob rotatably mounted over a portion of the handle member to interface with the sheath holder to move the sheath holder between an unlocked configuration, in which the sheath holder is movable together with the spool, and a locked configuration, in which the sheath holder is fixed relative to the handle member so that movement of the spool moves the first and second extending members longitudinally relative to the first and second sheaths.

* * * * *